(12) United States Patent
Holmes et al.

(10) Patent No.: US 9,599,249 B2
(45) Date of Patent: Mar. 21, 2017

(54) TWO-WAY FLOW CONTROL SOLENOID WITH AN AUTO PRESSURE REGULATING FEATURE

(71) Applicant: BorgWarner Inc., Auburn Hills, MI (US)

(72) Inventors: Garrett R. Holmes, Lake Orion, MI (US); Jeffrey J. Waterstredt, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 50 days.

(21) Appl. No.: 14/420,914

(22) PCT Filed: Aug. 23, 2013

(86) PCT No.: PCT/US2013/056351
§ 371 (c)(1),
(2) Date: Feb. 11, 2015

(87) PCT Pub. No.: WO2014/035809
PCT Pub. Date: Mar. 6, 2014

(65) Prior Publication Data
US 2015/0233488 A1 Aug. 20, 2015

Related U.S. Application Data

(60) Provisional application No. 61/695,468, filed on Aug. 31, 2012.

(51) Int. Cl.
*F16K 31/06* (2006.01)

(52) U.S. Cl.
CPC ...... *F16K 31/0693* (2013.01); *F16K 31/0658* (2013.01)

(58) Field of Classification Search
CPC .................. F16K 31/0658; F16K 31/0693
USPC ........................ 251/129.07, 129.15
See application file for complete search history.

(56) References Cited

U.S. PATENT DOCUMENTS

| 4,002,318 | A | * | 1/1977 | Von Koch | F16K 31/0668 251/129.08 |
|---|---|---|---|---|---|
| 5,072,752 | A | | 12/1991 | Kolchinsky | |
| 5,810,330 | A | | 9/1998 | Eith et al. | |
| 6,158,744 | A | * | 12/2000 | Jones | F16J 15/164 277/448 |
| 6,254,200 | B1 | | 7/2001 | Ganzel | |
| 6,328,275 | B1 | | 12/2001 | Yang et al. | |
| 7,793,944 | B2 | * | 9/2010 | Otuka | F16J 15/062 277/584 |
| 2005/0001190 | A1 | * | 1/2005 | Shirase | B60T 8/363 251/129.15 |
| 2006/0065870 | A1 | * | 3/2006 | Mori | F02M 59/34 251/129.07 |

(Continued)

OTHER PUBLICATIONS

International Search Report and Written Opinion for International Application No. PCT/US2013/056351, dated Dec. 13, 2013.

*Primary Examiner* — R. K. Arundale
(74) *Attorney, Agent, or Firm* — Warn Partners, P.C.

(57) ABSTRACT

A solenoid valve is provided having a hydraulic body that provides one of the poles for the solenoid valve. The hydraulic body has a central bore providing a bearing surface for an armature having an integral poppet. The poppet seals with a valve seat integral to the hydraulic body.

20 Claims, 1 Drawing Sheet

(56) References Cited

U.S. PATENT DOCUMENTS

| | | | |
|---|---|---|---|
| 2006/0249210 A1* | 11/2006 | Van Weelden | F15B 11/08 137/625.65 |
| 2011/0089350 A1* | 4/2011 | Beneker | F01L 1/34 251/129.15 |
| 2011/0198522 A1* | 8/2011 | Ambrosi | B60T 8/363 251/129.15 |
| 2015/0041693 A1* | 2/2015 | Jones | F16J 9/08 251/129.15 |

* cited by examiner

TWO-WAY FLOW CONTROL SOLENOID WITH AN AUTO PRESSURE REGULATING FEATURE

CROSS-REFERENCE TO RELATED APPLICATIONS

This application is a PCT International Application of U.S. Provisional Patent Application No. 61/695,468 filed on Aug. 31, 2012. The disclosure of the above application is incorporated herein by reference.

FIELD OF THE INVENTION

The present invention relates to solenoid valves, especially submersible solenoid valves which can be utilized with connecting an accumulator with a transmission hydraulic system.

BACKGROUND OF THE INVENTION

Most automotive vehicles having an automotive transmission utilize a hydraulic system which is electronically controlled by the usage of a plurality of solenoid valves. The hydraulic system is typically powered by a hydraulic pump which is either directly powered by an engine connected with the transmission or via a pump which is powered by an electrical system which is powered by the vehicle engine. In some automatic transmissions, it is desirable to provide a source of pressurized fluid in the vehicle transmission system which is available before the engine associated with the vehicle is started. To provide this source of hydraulic energy, there are two main options. One option is to provide a pump which can be powered by the vehicle electrical system (by being powered from the vehicle battery). A second option is to provide a pressurized accumulator which can be charged while the engine is operating and then held in a stored condition to be discharged upon the restarting of the vehicle. It is desirable to provide a solenoid valve which can be utilized with accumulator systems which does not present a drain on the vehicle electrical system to keep the accumulated charged and which can be rapidly actuated to dump the charge of the accumulator during initial start up of the vehicle.

SUMMARY OF THE INVENTION

To meet the above noted desires and to provide other advantages, a revelation of the present invention is brought forth. The present invention brings forth a solenoid valve having a hydraulic body that provides one of the poles for the solenoid valve. The hydraulic body has a central bore providing a bearing surface for an armature having an integral poppet. The poppet seals with a valve seat integral to the hydraulic body.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 2:
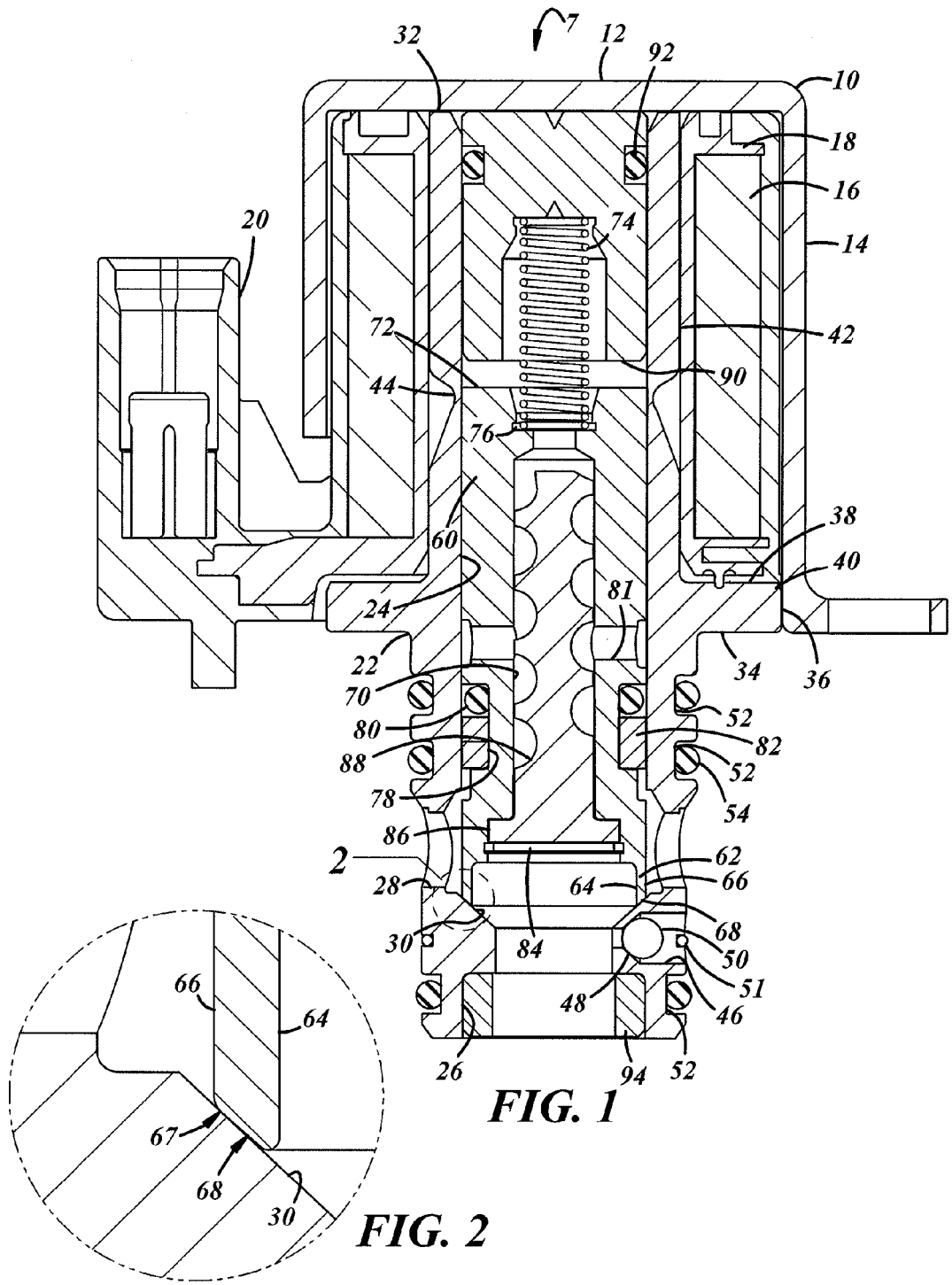
FIG. 1 is a sectional view of a preferred embodiment solenoid valve of the present invention.
FIG. 2 is an enlargement of a portion of FIG. 1.

The following description of the preferred embodiment(s) is merely exemplary in nature and is in no way intended to limit the invention, its application, or uses.

Referring to FIGS. 1 and 2, a solenoid valve 7 according to the present invention is provided. The solenoid valve 7 has a stamped ferromagnetic casing 10 having a generally circular flat 12 and generally cylindrical side walls 14. Positioned within the casing 10 is a coil 16 which is wrapped within a non-magnetic bobbin 18. An electrical connector 20 is provided to selectively deliver current to the coil 16. Positioned within a generally cylindrical cavity of the coil 16 and bobbin 18 is a hydraulic body 22. The hydraulic body 22 has a central multiple diameter axial bore 24 providing a bearing surface. The body 22 is fabricated with ferromagnetic material. The body 22 also has a first generally axial port 26 connected to the transmission system pressure and a second transverse or side port 28 connected to a hydraulic accumulator and intersecting with the central bore 24. Positioned between the first port 26 and second port 28 is an integral conical seat 30. The body 22 makes axial direct magnetic contact with the flat 12 of the casing via its axial extreme end 32. The body 22 also has an integral ring flange 34 which typically has an interference between its radial extreme end 36 and the casing cylindrical side wall 14 for optimal radial magnetic connection. On a face 38 of flange 34 the body may capture and position the bobbin 18 within the casing 10. As shown, the body 22 forms an integral flux return member 40 which is magnetic flux separated to a pole 42 by a magnetic flux choke 44. Between the first port 26 and the second port 28 or rather between the first port 26 and the conical seat 30 is a third port 46 having a check valve including valve seat 48 and check ball member 50 and ball retainer 51. The body has three annular grooves 52 to allow for placement of sealing rings 54 to seal the body.

Slidably mounted within the central bore 24 of the body and having an outer diameter providing a surface coaxially aligned by the bearing surface 24 of the body is an armature 60. The armature is typically a ferromagnetic member and has an integrally formed poppet 62 with an inner diameter 64 and outer diameter 66. The poppet has a conical valve face 68 that is shallower (that is angled closer to the horizontal than that of valve seat 30 to ensure that the outer diameter edge of the valve face 68 initially seals first. It is desirable that the valve 68 make contact with the valve seat 30 at the same diameter as the diameter of the central bore 24. To factors prevent the achievement of the above noted desire. First, the poppet maximum outer diameter 66 must be smaller than the diameter of central bore 24 to allow placement of the armature 60 into the central bore 24. Secondly, valve face 68 due to machining tolerance, is not geometrically perfectly sharp and there is a controlled radius at top of the poppet. Therefore, the poppet contact diameter 67 is even smaller than the poppet outer diameter 66. The ratio of poppet contact diameter 67 to the diameter of the central bore 24 (poppet sealing ratio) should be greater than 0.95.

The armature 60 has a multiple diameter central passage 70 which intersects with an axial face 72 of the armature. The armature axial face 72 is exposed to the hydraulic pressure of the first port 26 due to the central passage 70. The armature 60 is biased towards the valve seat 30 of the body by a spring 74 which has an extreme end abutting a spring seat 76 provided in the armature. The armature has an annular groove 78 wherein there is a placement of a pressure compressible sealing ring 80 and a pressure block 82. The armature has a cross bore 81 axially between the axial face 72 and the second port 28 intersecting the central passage 70 and the outer diameter of the armature. The cross bore 81 aids the maintenance of a larger pressure differential across the sealing ring 80. The armature also has an annular groove with retaining clip 84 mounted therein. The retaining clip holds in a tortuous vent insert 86 which is typically fabricated from a polymeric material and has a spiral path or groove 88 formed on its outer periphery. The spiral path causes any fluid which ends up in a working area between the armature 60 and a plug pole piece 90 that have to follow a torturous path which inhibits the transmission of metal shavings and/or other metallic or other contaminants in the hydraulic fluid reaching the area between the armature 62 and the pole piece 90. The pole piece 90 is generally positioned adjacent the body extreme ends 32 and is also contacting with the flat 14 of the casing. The pole piece 90 is typically fabricated from a ferromagnetic material and is sealed within the body 22 an outer seal 92 placed within an annular groove of the pole piece.

Mounted within the first port 26 is a permanent magnet 94 which also inhibits metallic impurities within the transmission fluid from migrating between the armature and the pole piece 90.

By having the valve seat integral with the body 22 and by having the armature being aligned by the body central bore 24 and by having the poppet being integral with the armature, high levels of concentric accuracy can be maintained leading to less chances of leaks due to dimensional tolerances.

The second port 28 is typically connected with an accumulator. The third port 46 acts as a feed orifice which is additionally connected with the accumulator. During the charging operation into the accumulator, fluid flows through the first or system port 26 and then lifts up the check ball 50 and flows into the accumulator (not shown). Typically, the spring 74 and pressure acting on the differential area between the body central bore 24 and poppet 62 contact diameters will hold the armature 60 down in its sealed position. When the accumulator is fully charged, the spring force holds the armature radius against the body conical seat 30 to provide a low leakage interface. The spring 74 has sufficient load to hold against the accumulator pressure at the second port 28 which is acting against the differential area between the body central bore 24 and poppet 62 contact diameters. Check ball 50 prevents the passage of fluid back through the third port 46. Since fluid is allowed to flow through the central passage of the armature, the armature is balanced and there is a slight biasing force due to the pressure acting on the axial face 72 being of a larger area than the fluid pressure acting to lift the armature from the valve seat plus the biasing force of the spring. To discharge the accumulator, the coil 16 is activated causing the armature 60 to move towards the pole piece 90 and fluid then flows from the second port 28 to the first or system port 26. When the accumulating pressure is larger than the system pressure, the solid energizing ring squeezes 78 the elastomeric seal 80 and forces it into contact with the body central bore 24 and seals the armature 60 outer diameter. When the armature is pulled upward by a magnetically energizing solenoid coil 16, the seal 80 is released from the body central bore 24 and allows for drag free actuation. On discharged very high flow rate can flush the magnet 94 and return contaminants to the transmission to be filtered by a filter within the transmission.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid valve comprising:
    a ferromagnetic casing;
    a coil positioned within said casing;
    a ferromagnetic hydraulic body positioned within said coil, said body having a central bore with an axial bearing surface with first and second ports and an integral conical valve seat between said ports, said body providing a flux return of said solenoid;
    an armature slidably mounted within said central bore having an outer diameter surface in contact with said body central bore and being aligned thereby, said armature having an integral conical poppet with a sealing ratio greater than 0.95, an angle of said poppet being shallower than an angle of said valve seat, said armature having a through passage exposing an axial face of said armature generally opposite said body first port to hydraulic pressure of said body first port; and
    a spring biasing said poppet of said armature to prevent flow from said body second port to said body first port until energization of said coil.

2. A solenoid valve as described in claim 1 wherein said first port is at an axial extreme of said body and wherein said second port is at a cross bore of said housing body.

3. A solenoid valve as described in claim 1 wherein said body provides a flux choke.

4. A solenoid valve as described in claim 1 where said body provides a direct magnetic contact with said casing.

5. A solenoid valve as described in claim 1 wherein said body has an exterior flange ring.

6. A solenoid valve as described in claim 1 wherein said body has a permanent magnet positioned within said first port.

7. A solenoid valve as described in claim 1 wherein said body has a third port between said first port and said valve seat with a check valve installed therein.

8. A solenoid valve as described in claim 1 wherein said armature has a spiral vent within said through passage.

9. A solenoid valve as described in claim 1 wherein said armature has a pressure energized sealing said armature with said body between said second port and said opposite face of said armature.

10. A solenoid valve as described in claim 9 wherein said armature has a cross bore intersecting said central passage and an outer diameter of said armature between said armature axial face and said pressure energized sealing of said armature to maximize a pressure differential across said pressure energized seal.

11. A solenoid valve as described in claim 1 wherein said solenoid valve further includes a pole piece positioned within said body generally adjacent an extreme end of said body.

12. A solenoid valve as described in claim 1 wherein said body has direct magnetic contact with said casing via a radial contact and an axial contact.

13. A solenoid valve comprising:
    a casing having a generally closed end and generally cylindrical side ends;
    a coil positioned within said casing;
    a ferromagnetic hydraulic body positioned within said coil having axial and radial direct magnetic contact with said casing, said body having a multiple diameter central bore with a bearing surface and a first axial port and a second side port and a conical seat positioned between said first and second ports, and said body having a third port between said first port and said conical seat, said third port having a check valve therein and wherein said body having an integrally connected flux return member separated from a portion of said body by a flux choke;

a pole piece generally positioned in said body adjacent an extreme end of said body an armature slidaby mounted within said central bore of said body having an outer diameter surface in contact with said bearing surface of said housing, said armature having an integral poppet with a conical angle shallower than said angle of said conical seat and wherein said poppet has a sealing ratio greater than 0.95 and wherein said armature has a through bore exposing an axial face of said armature generally opposite said first port to hydraulic pressure of said first port and wherein said armature has a sealing member between said axial face and said second port; and a spring biasing said armature poppet toward said valve seat.

14. A solenoid valve comprising:

a ferromagnetic casing;

a coil positioned within said casing;

a ferromagnetic hydraulic body positioned within said coil, said body having a central bore with an axial bearing surface with first and second ports and an integral seat between said ports, said body providing a flux return of said solenoid;

an armature slidably mounted within said central bore having an outer diameter surface in contact with said body central bore and being aligned thereby, said armature having an integral poppet with a sealing ratio greater than 0.95, said armature having a through passage exposing an axial face of said armature generally opposite said body first port to hydraulic pressure of said body first port, and wherein said armature has a spiral vent within said through passage; and a spring biasing said poppet of said armature to prevent flow from said body second port to said body first port until energization of said coil.

15. A solenoid valve as described in claim 14 wherein said valve seat is conical.

16. A solenoid valve as described in claim 15 wherein said armature poppet is conical and wherein an angle of said poppet is shallower than an angle of said valve seat.

17. A solenoid valve as described in claim 14 wherein said body has a permanent magnet positioned within said first port.

18. A solenoid valve as described in claim 14 wherein said body has a third port between said first port and said valve seat with a check valve installed therein.

19. A solenoid valve as described in claim 14 wherein said armature has a pressure energized sealing said armature with said body between said second port and said opposite face of said armature.

20. A solenoid valve as described in claim 14 wherein said armature has a cross bore intersecting said central passage and an outer diameter of said armature between said armature axial face and said pressure energized sealing of said armature to maximize a pressure differential across said pressure energized seal.

* * * * *

UNITED STATES PATENT AND TRADEMARK OFFICE
CERTIFICATE OF CORRECTION

| | |
|---|---|
| PATENT NO. | : 9,599,249 B2 |
| APPLICATION NO. | : 14/420914 |
| DATED | : March 21, 2017 |
| INVENTOR(S) | : Garrett R. Holmes et al. |

It is certified that error appears in the above-identified patent and that said Letters Patent is hereby corrected as shown below:

In the Specification

Column 1,
Line 5 Please replace the paragraph under the section CROSS-REFERENCE TO RELATED APPLICATION with the following paragraph:
-- This application is the U.S. National Phase Application of PCT/US2013/056351, filed August 23, 2013, which claims the benefit of U.S. Provisional Application No. 61/695,468, filed August 31, 2012. --

Column 2,
Line 47, please insert -- ) --, after -- 30 --

Column 2,
Line 50, "To" should be -- Two --

Column 3,
Line 10, "tortuous" should be -- torturous --

Column 3,
Line 65, "On discharge very high flow" should be -- Upon discharge, a very high flow --

In the Claims

Column 4,
Line 29, Claim 2 "bore of said housing body" should be -- bore of said body --

Signed and Sealed this
First Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,599,249 B2

Column 5,
Line 11, Claim 13 "slidaby" should be -- slidably --

Column 5,
Line 13, Claim 13 "housing" should be -- body --